Dec. 25, 1934.  R. R. TEETOR  1,985,699
PISTON
Filed March 23, 1932
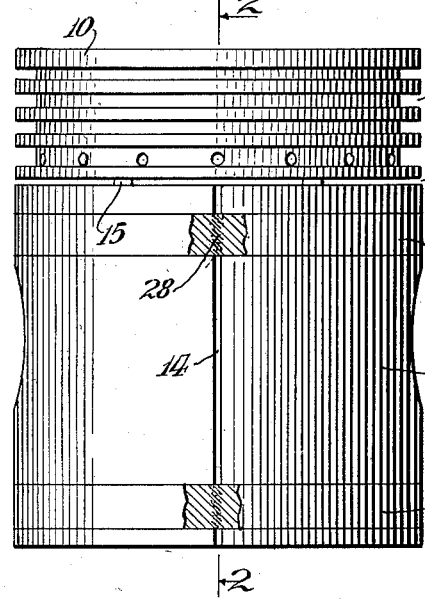
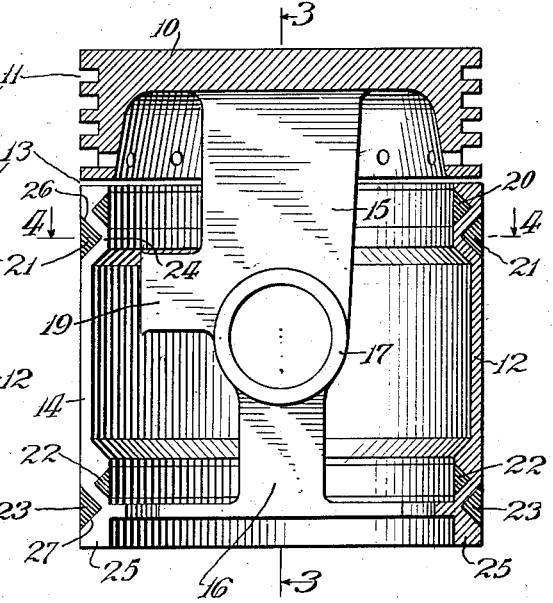
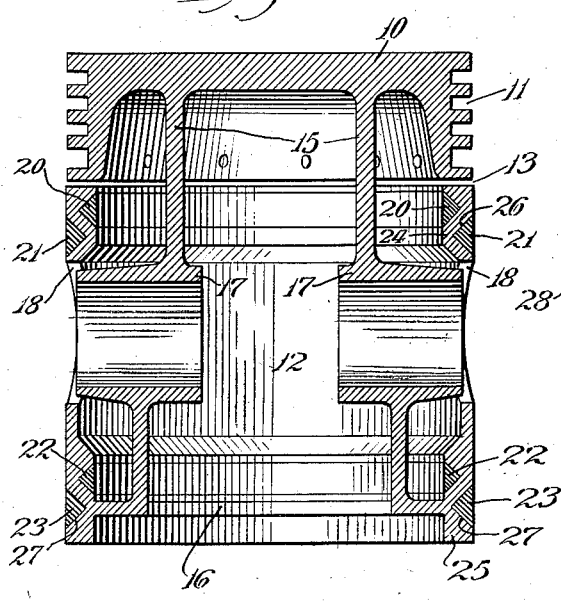
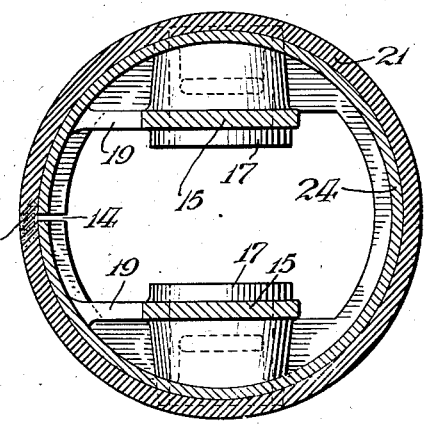
Inventor:
Ralph R. Teetor,
By Rector, Hibben, Davis & Macauley
Attorneys.

UNITED STATES PATENT OFFICE 1,985,699

PISTON

Ralph R. Teetor, Hagerstown, Ind., assignor to The Perfect Circle Company, Hagerstown, Ind., a corporation of Indiana Application March 23, 1932, Serial No. 600,701

7 Claims. (Cl. 309—13)

My invention relates to pistons for internal combustion engines and the like.

The principal object of my invention is to provide a simple and inexpensive piston so designed that the most efficient clearance is uniformly maintained between the piston skirt and cylinder wall throughout the entire operating temperature and speed ranges of the engine. In the fulfillment of the foregoing, my invention contemplates the provision of a piston wherein the higher thermal expansion of the head does not distort or change the shape of the skirt nor are the predetermined dimensions of the skirt materially changed under maximum temperature operating conditions; wherefore my invention insures high efficiency in oil control and elimination of piston slap, blow-by, undue friction and excessive wear.

Another object is to provide a piston of split-skirt form, the skirt of which is provided with one or more bands or rings formed of relatively inexpansible material, the band or bands being so associated with the skirt that expansion and contraction movements of the skirt take place relative to and circumferentially of the band or bands substantially within dimensional limits determined by the dimensions of the latter.

Other objects and advantages will become apparent as this description progresses and by reference to the drawing wherein,—

Figure 1 is an elevational view, partially in section, of one form of piston constructed in accordance with my invention;

Fig. 2 is a section taken substantially on line 2—2 of Fig. 1;

Fig. 3 is a section taken substantially at right angles to Fig. 2 and substantially on line 3—3 of that figure; and Fig. 4 is a horizontal section taken substantially on line 4—4 of Fig. 2.

The piston which I have chosen to illustrate my invention is made, preferably, of an aluminum alloy; but I do not wish to be limited to this particular material, since it will be obvious that other materials having a lower specific gravity than iron may be employed. This piston includes a head 10 having the usual ring grooves 11, and a skirt 12 separated from the head by a circumferential slot 13. The skirt is provided with a longitudinal slot 14 extending throughout the length thereof.

By referring particularly to Figs. 2 and 3, it will be seen that the head and skirt are integrally joined together by a pair of opposed, vertical webs 15 depending from the top of the head and connected to the bottom of the skirt by a circumferential rib 16. These webs support piston pin bosses 17 of conventional form, the pin bores of which align with suitably sized openings 18 in the skirt. The webs 15 are of such width and thickness as to amply serve for connection of the head and skirt as well as supporting the piston pin bosses, and they are sufficiently flexible to accommodate the relatively greater expansion of the head as compared to the skirt and the connecting parts. To give additional support, the webs 15 at the top of the piston pin bosses are each integrally connected to the upper part of the skirt by a lateral strut 19 which is sufficiently flexible to accommodate flexing movement of the webs 15 under the expansive action of the head 10 with lessened tendency of flexing movement of the webs 15 to distort the skirt 12.

The skirt 12 is initially formed by casting and finishing to a diameter designed, normally, to have that clearance with respect to the cylinder wall adapted to give maximum efficiency under all operating temperature and speed conditions; and, in carrying out my invention, the dimensional limits and shape of the piston skirt are closely maintained to maintain this desired clearance relationship. To this end I mount upon the piston skirt one or more continuous bands or rings which are formed of material, such as nickel steel, which is relatively inexpansible as compared with the aluminum alloy from which the skirt 12 is formed. These bands fit tightly upon the skirt and maintain the same, substantially, within normally contracted size and dimensions.

Specifically, with respect to the form shown in the drawing, I may employ four such bands of rings 20, 21, 22 and 23. When four of these bands are employed they are arranged, preferably, (but not necessarily) with one inside and one outside band at the top of the skirt and one inside and one outside band at the bottom of the skirt. In this particular arrangement of bands, those at each end are located in close proximity to each other and are staggered. The inside bands 20 and 22 are, preferably, initially formed continuous and are embodied in the inner thickened wall portions 24 and 25 at the top and bottom of the skirt, respectively, by casting the skirt upon the same. The outer bands 21 and 23 are, preferably, initially split and inserted in grooves 26 and 27, respectively, formed in the outer wall of the piston skirt after the latter it cast. After the outer bands are snugly and uniformly seated in their grooves, their split ends are welded together in any suitable and well-known manner, as at 28

(Fig. 1), providing continuous, relatively inexpansible bands adapted to hold the skirt against diametrical expansion movement. The inner continuous and relatively inexpansible inner bands 20 and 22 hold the skirt against diametrical contraction movement. With the foregoing arrangement, the aluminum alloy does not adhere and grip longitudinally or circumferentially of the bands, permitting slippage between the skirt and bands, wherefore the piston skirt is free to expand circumferentially of and with respect to all of the bands. It will thus be seen that the skirt is positively limited in diametrical expansion by the outer bands 21 and 23 and is positively limited in diametrical contraction by the inner bands 20 and 22. I, preferably, make the body of the bands triangularly-shaped in cross-section so as to not only insure against removal of the same once they are applied, but also to prevent the aluminum from gripping the section of the ring as the aluminum cools and contracts. However, it is to be understood that the cross-sectional shape of the bands may be varied so long as the desired slippage of the skirt circumferentially of the bands is amply insured. The outer faces of the outer bands are, preferably, (but not necessarily) flush with the outer finished wall of the piston skirt and this may be provided for by first mounting the bands in their respective grooves and simultaneously finishing the outer faces of both the bands and the skirt.

In operation, as it is well known, the head is at a higher temperature than the skirt and the greater portion of the heat in the head is conducted directly through the usual piston rings to the water jacketed walls of the cylinder. Some of the heat from the head, however, flows downward through the vertical webs 15 to the skirt tending to cause a radial expansion of the same, but since the diametrical limits are fixed by the relatively inexpansible bands the skirts can only expand and contract circumferentially of such bands, as permitted by the skirt slot 14. Furthermore, since these bands are not affected materially by operating temperature conditions, they are not distorted and, in circumscribing the skirt as described, they oppose and eliminate distortion of the skirt due to its tendency toward radial expansion. The bands strengthen the skirt against cross head pressures and against too great flexibility even though the skirt slot extends throughout the length of the skirt. From the foregoing, it will be appreciated that the piston skirt under all operating conditions is substantially maintained within predetermined shape and diametrical dimensional limits and the predetermined and most efficient clearance is substantially maintained under all operating conditions. Thusly, high pressure areas are avoided, reducing wear to a minimum, eliminating piston slap, blow-by and excessive friction, and insuring maximum efficiency in oil control. Furthermore, all of these advantages are gained in the use of a piston which is quite simple in construction and is inexpensive to manufacture.

It will be understood that while I have shown only one form of my invention, various changes in details and arrangements of parts, obvious from the foregoing description, may be made therein without departing from the spirit and scope of my invention as defined by the claims which follow. For example, the arrangement and number of the bands may be varied. I may employ one outside band located at any convenient position with two inside bands; or one inside band located at any convenient position and two outside bands; or one inside band and one outside band may serve the purpose; or I may employ only inside bands, which will serve not only to maintain the skirt shape but will control diametrical expansion of the skirt. Furthermore, as shown in the drawing, the band or bands are located concentrically with respect to the skirt; but, I have found that excellent results may be obtained by locating the inside band or bands eccentrically with respect to the skirt. In this latter case, the inside bands are, preferably, so located that the thickness of the aluminum over the face of the band is greater at a point directly opposite the vertical slot in the skirt and is thinner adjacent the slot.

I claim:

1. A piston having a head, a skirt provided with a longitudinal slot extending throughout its length and entirely separated from said head by a circumferential slot, means including vertical webs and lateral struts connecting said head and skirt, a continuous band of relatively inexpansible material extending circumferentially around and in snug-fit engagement with the inner wall of said skirt, and another continuous band of relatively inexpansible material extending circumferentially around and in snug-fit engagement with the outer wall of said skirt, both of said bands being normally fitted tightly upon the piston skirt while free for circumferential slip movement of the piston skirt relative thereto, and said bands being longitudinally offset from each other.

2. A piston having a head, a skirt provided with a longitudinal slot and entirely separated from said head by a circumferential slot, means connecting said head and skirt, a continuous band having a body triangularly-shaped in cross-section and formed of relatively inexpansible material extending circumferentially around and in snug-fit engagement with the inner wall of said skirt and having only two of its sides engaged with said skirt, and another band having a body triangularly-shaped in cross-section and formed of relatively inexpansible material extending circumferentially around and in snug-fit engagement with the outer wall of said skirt and having only two of its sides engaged with said skirt, both of said bands being adapted for slip-engagement circumferentially with said skirt and being longitudinally offset from each other.

3. A piston having a head, a skirt provided with a longitudinal slot extending throughout the length thereof and separated entirely from said head by a circumferential slot, means including webs connected to the bottom of said skirt and struts connected to the upper portion of said skirt connecting said head and skirt, a pair of spaced, continuous bands formed of relatively inexpansible material extending circumferentially around and in close fit relative to the inner wall of said skirt, one of said bands being located adjacent said web-and-skirt connection and the other located adjacent said skirt-and-strut connection, and a continuous band formed of relatively inexpansible material extending circumferentially around and in close fit relation to the outer wall of said skirt and longitudinally offset from said inner wall bands, said skirt being circumferentially expansible within the limit of its slot and circumferentially of said bands.

4. A piston having a head, a skirt provided with a longitudinal slot and entirely separated from said head by a circumferential slot, means connecting said head and skirt, a continuous band formed of relatively inexpansible material extending circumferentially around and in close fit relation to the inner wall of said skirt, and a pair of spaced, continuous bands formed of relatively inexpansible material extending circumferentially around and in close fit relation to the outer wall of said skirt, one of said outer wall bands being located at the top of said skirt and the other at the bottom of said skirt, and said inner wall band being offset from said outer wall bands longitudinally of said skirt, said skirt being circumferentially expansible within the limit of its slot and circumferentially of said bands.

5. A piston having a head, a skirt provided with a longitudinal slot and entirely separated from said head by a circumferential slot, means connecting said head and skirt, a pair of spaced, continuous bands formed of relatively inexpansible material extending circumferentially around and in close fit relation to the inner wall of said skirt, and a pair of spaced, continuous bands formed of relatively inexpansible material extending circumferentially around and in close fit relation to the outer wall of said skirt, said skirt being circumferentially expansible within the limit of its slot and circumferentially of said bands, all of said bands being of comparative large size and being of such shape in cross-section that only two sides of each thereof engage said skirt wall when fitted upon the latter.

6. A piston having a head, a skirt provided with a longitudinal slot and separated from said head by a circumferential slot, means connecting said head and skirt, a pair of spaced, continuous bands formed of relatively inexpansible material extending circumferentially around and in close fit relation to the inner wall of said skirt, and a pair of continuous bands formed of relatively inexpansible material extending circumferentially around and in close fit relation to the outer wall of said skirt, the adjacent of said inside and outside bands being staggered with respect to each other.

7. A piston having a head, a longitudinally slotted skirt connected thereto and separated therefrom by a continuous circumferential slot, said head and skirt being formed of an expansible material and said skirt having at least one circumferential groove of triangular-shape in cross-section in its outer side wall, a continuous ring formed of relatively expansible material and having a body of triangular-shape in cross section mounted in said groove with only two of its sides engaged with said skirt and its other side finished substantially flush with the adjacent outer wall surface of said skirt, and a similar ring similarly mounted upon the inner wall of said skirt.

RALPH R. TEETOR.